Patented Nov. 12, 1929

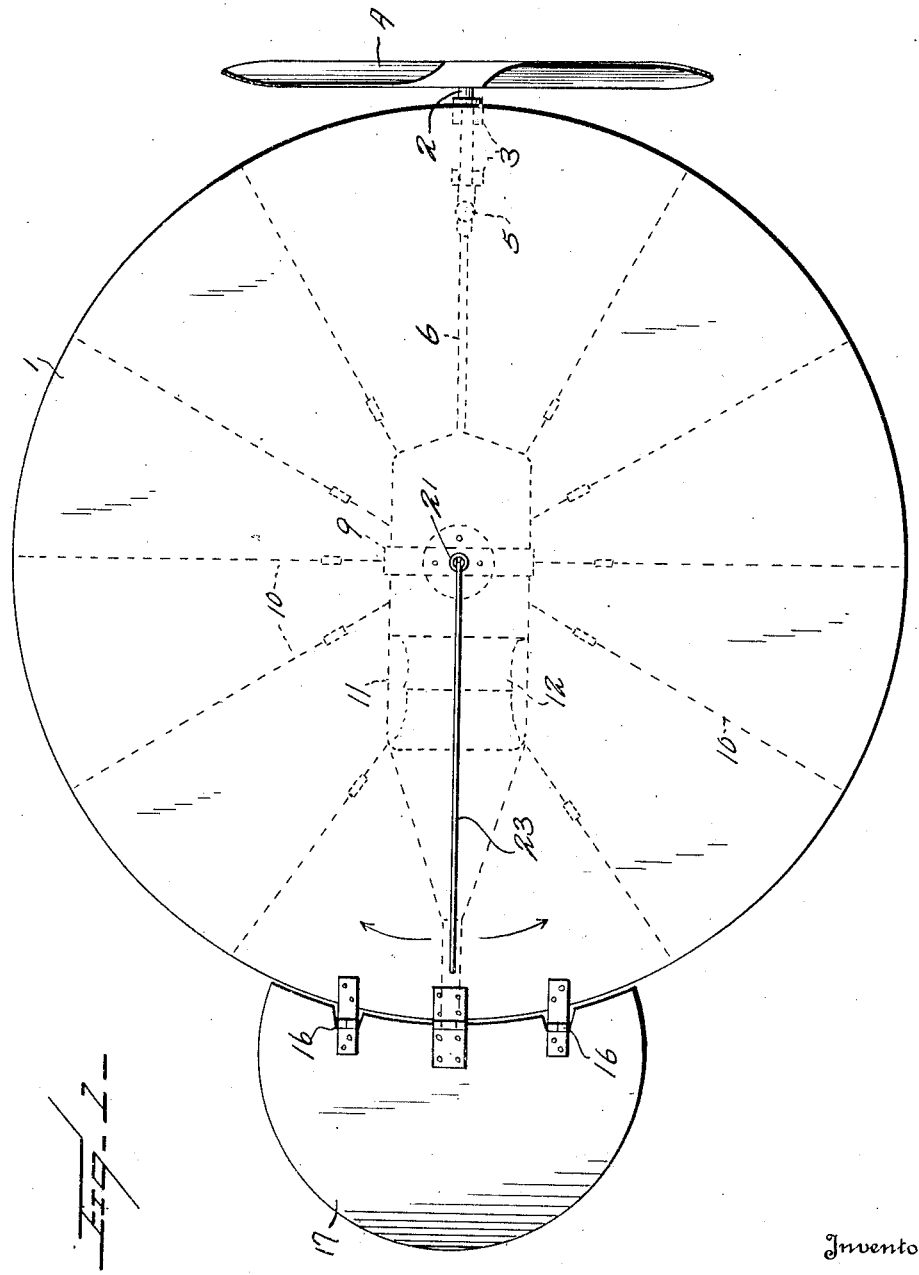

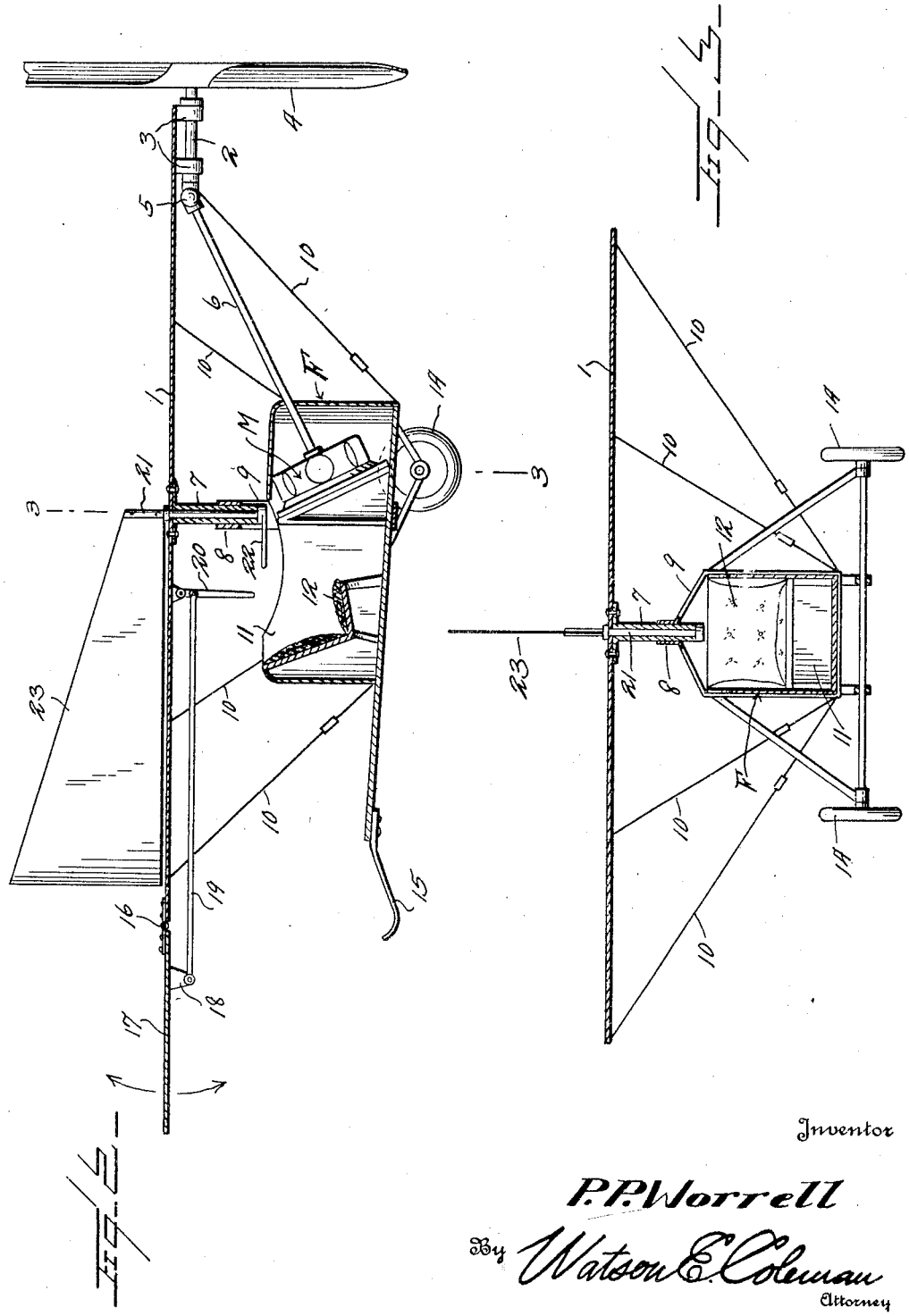

1,735,308

UNITED STATES PATENT OFFICE

PAOLA P. WORRELL, OF CHESTER, IDAHO

AIRPLANE

Application filed October 29, 1927. Serial No. 229,676.

This invention relates to airplanes and it is an object of the invention to provide an apparatus of this kind wherein is eliminated the liability of tail spin, nose dive and side slip and whereby flight is sustained in the event the propeller breaks or the engine stops.

Another object of the invention is to provide an apparatus of this kind embodying a plane or wing substantially coplanar in all directions and wherein the various other parts comprised in the apparatus are arranged to maintain a balance with respect to the central portion of the plane when the machine is in flight.

A further object of the invention is to provide a device of this kind comprising a sustaining plane or wing substantially coplanar in all directions together with an elevator operatively engaged with the peripheral portion thereof and extending therebeyond.

The invention consists in the details of construction and in the combination and arrangement of the several parts of my improved airplane whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan illustrating an airplane constructed in accordance with an embodiment of my invention, certain of the features being indicated by broken lines;

Figure 2 is a view partly in vertical section and partly in side elevation of the structure as illustrated in Figure 1;

Figure 3 is a sectional view taken substantially on the line 3—3 of Figure 2.

As disclosed in the accompanying drawings, 1 denotes a wing or plane of requisite dimensions and circular in plan, said wing or plane being substantially coplanar in all directions so that when the plane or wing 1 during flight is substantially horizontal a maximum of speed may be attained.

The forward peripheral portion of the plane or wing 1 is provided with a laterally disposed shaft section 2 supported below the plane or wing 1 by the bearings 3 depending therefrom. The outer portion of the shaft section 2 carries the propeller 4 of desired type while the inner end portion of the shaft section 2 is operatively connected, as at 5, by a universal joint with the drive shaft 6 disposed downwardly on a predetermined incline and driven from the motor M carried by the forward portion of the fuselage F. The motor M, as herein disclosed, is positioned adjacent to and forwardly of the axial center of the plane or wing 1.

Depending from the plane or wing 1 at the axial center thereof is a tubular member or barrel 7 to the lower portion of which is fixed in any desired manner, as at 8, the upper portion of a yoke 9 operatively engaged with the fuselage F and herein disclosed as in the character of a saddle substantially surrounding said fuselage and having close contact with the side and bottom walls thereof. The yoke or saddle 9 is positioned at a point intermediate the ends of the fuselage F to assure an effective balance of said fuselage and its load with respect to the axial center of the plane or wing 1 and particularly when the apparatus is in flight.

The peripheral portion of the plane or wing 1 at predetermined points equidistantly spaced circumferentially therearound is operatively engaged with the fuselage F through the medium of the struts or stays 10. The rear portion of the fuselage F constitutes a top pit 11 in which is arranged a seat 12. The forward portion of the fuselage is provided with a land surface running gear 14 while the rear portion of the fuselage carries a spring support 15. The shaft section 2 is disposed lengthwise of the fuselage F at substantially the transverse center thereof and the opposite or rear portion of the plane or wing 1 has hingedly connected thereto, as at 16, an elevator 17. This elevator 17 is disposed entirely beyond the plane or wing 1 and has swinging movement in a vertical direction in order to control the position of the plane or wing 1 with respect to the horizontal, thus regulating the speed at which the apparatus travels and also to effect the desired lifting and lowering of the machine.

As herein disclosed, the elevator 17 is also substantially coplanar in all directions and in plan is in excess of a semi-circular and when in a horizontal position is coplanar with the wing or plane 1. The inner or hinged margin of the elevator 17 is disposed on a curvature substantially the same as the peripheral curvature of the plane or wing 1 so that in assembly the elevator 17 will be positioned closely adjacent to the wing or plane 1. This elevator 17 is substantially equidistantly disposed beyond opposite sides of the vertical plane occupied by the shaft section 2.

The inner or hinged portion of the elevator 17 midway its inner margin is provided with a depending arm 18 with which is operatively engaged an end portion of a rod 19. This rod 19 extends inwardly of and below the plane or wing 1 and is operatively engaged with a lever 20 pivotally engaged with the plane or wing 1 and depending therefrom at a point substantially above the seat 12 within the fuselage F. This particular location of the lever 20 permits the occupant of the seat 12 to readily and conveniently manipulate said lever 20 to effect the desired control of the elevator 17.

Disposed through the tubular member or barrel 7 is a rod 21 the lower end portion of which below said member or barrel 7 having affixed thereto an operating handle 22 whereby said rod 21 may be readily rotated as desired by the occupant of the seat 12. This rod 21 extends a desired distance above the wing or plane 1 at the axial center thereof and said upwardly extended portion has secured thereto the inner end portion of a rudder 23. This rudder 23 is swung from end to end and of a length to terminate at a point in relatively close proximity to the periphery of the wing or plane 1. The rudder 23 has its side flat faces vertically disposed and increases in height from its inner or connected end portion to its outer end portion. Upon proper manipulation of the handle 22 the rudder 23 may be adjusted as desired to control the direction of forward travel of the apparatus.

It is to be noted that the various parts of my improved airplane are mounted and supported with respect to the plane or wing 1 to assure an effective balance of the apparatus, particularly with respect to the central portion of the wing or plane 1. This is of importance as by such assembly and arrangement is eliminated the liability of side slip, tail spin or nose dive and also assures a sustaining flight or gliding action in the event the propeller breaks or the engine stops.

From the foregoing description it is thought to be obvious that an airplane constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. As a new article of manufacture, a circular plane, a propeller rotatably supported by a peripheral portion of the plane and rotating about an axis radial with respect to said plane, an elevator carried by the peripheral portion of the plane opposed to the propeller, and a rudder disposed radially of the plane, and means at the axial center of the plane for supporting the rudder for turning movement.

2. An airplane comprising, in combination, a circular plane, a member depending from the axial center thereof, a fuselage below the plane, a supporting yoke extending upwardly and over the central portion of the fuselage and having connection with said member, a propeller rotatably supported by the forward peripheral portion of the plane, power means carried by the fuselage and operatively engaged with the propeller for rotating the same, an elevator carried by the rear peripheral portion of the plane, and means depending from the plane and operatively engaged with the elevator for adjusting the same, said last means carried by the plane being positioned above the fuselage.

3. An air plane comprising, in combination, a circular plane, a member depending from the axial center thereof, a fuselage below the plane, means for connecting said member with the fuselage at a point intermediate the ends thereof, a propeller rotatably supported by the forward peripheral portion of the plane, power means carried by the fuselage and operatively engaged with the propeller for rotating the same, an elevator carried by the rear peripheral portion of the plane, means depending from the plane and operatively engaged with the elevator for adjusting the same, the means carried by the plane being positioned above the fuselage, a rudder positioned above the plane and disposed radially thereof, means for rotatably supporting the inner end portion of the rudder at the axial center of the plane, and means operable from within the fuselage for adjusting the rudder.

4. In an airplane structure, a circular plane, propelling means therefor, an elevator carried by the peripheral portion of the plane opposed to the propelling means, and a rudder arranged over the top of the plane and adapted to be swung about the radial center thereof for controlling the horizontal movement of the structure.

In testimony whereof I hereunto affix my signature.

PAOLA P. WORRELL.